(12) United States Patent
Stapleton (10) Patent No.: US 12,088,704 B1
(45) Date of Patent: Sep. 10, 2024

(54) SYSTEMS AND METHODS FOR QUANTUM ENTANGLED RANDOM KEY EXCHANGE

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/657,274

(22) Filed: Mar. 30, 2022

(51) Int. Cl.
*H04L 9/00* (2022.01)
*H04L 9/08* (2006.01)

(52) U.S. Cl.
CPC .......... *H04L 9/0852* (2013.01); *H04L 9/0869* (2013.01); *H04L 9/0877* (2013.01)

(58) Field of Classification Search
None
See application file for complete search history.

(56) References Cited

U.S. PATENT DOCUMENTS

| | | | |
|---|---|---|---|
| 5,535,119 A * | 7/1996 | Ito | G06F 40/53 715/264 |
| 8,650,401 B2 | 2/2014 | Wiseman et al. | |
| 8,855,316 B2 | 10/2014 | Wiseman et al. | |
| 10,757,083 B2 | 8/2020 | Fu et al. | |
| 11,689,360 B2 * | 6/2023 | Lee | H04L 9/0822 380/281 |
| 2006/0115086 A1 * | 6/2006 | Beausoleil | G06F 7/588 380/263 |
| 2011/0268274 A1 * | 11/2011 | Qiu | H04L 9/0844 380/270 |
| 2014/0363174 A1 | 12/2014 | Azuma et al. | |
| 2018/0124029 A1 * | 5/2018 | Zibuschka | H04L 63/0823 |
| 2020/0313890 A1 * | 10/2020 | Mondello | H04L 9/3239 |
| 2020/0351086 A1 | 11/2020 | Walenta et al. | |
| 2021/0083864 A1 | 3/2021 | Bush | |
| 2021/0175976 A1 | 6/2021 | Rahman | |

FOREIGN PATENT DOCUMENTS

| | | |
|---|---|---|
| EP | 3886356 A1 | 9/2021 |
| JP | 6708062 | 6/2020 |
| WO | 2020221085 A1 | 11/2020 |
| WO | 2021028227 A1 | 2/2021 |

OTHER PUBLICATIONS

Ying Guo, Trans-Media Continuous-Variable Quantum Key Distribution via Untrusted Entanglement Source, IEEE Photonics Journal Year: 2021, vol. 13, No. 2, Apr. 2021.

* cited by examiner

*Primary Examiner* — Sanchit K Sarker
(74) *Attorney, Agent, or Firm* — K&L Gates LLP (57) ABSTRACT

Systems, apparatuses, methods, and computer program products are disclosed for secure key exchange. An example method includes receiving, by communications hardware of a first device, a message from a second device. The example method also includes encrypting, by data protection circuitry of the first device, the message using a first key shared between the first device and a third device, wherein the first key is derived based at least on a first random bit set known to the first device and the third device. The example method also includes causing transmission, by the communications hardware of the first device, of the encrypted message to the third device.

17 Claims, 8 Drawing Sheets

SYSTEMS AND METHODS FOR QUANTUM ENTANGLED RANDOM KEY EXCHANGE

BACKGROUND

In situations in which multiple devices need to encrypt and transmit data, point-to-point (P2P) encryption is often relied upon. However, P2P encryption involves significant overhead, which affects performance of data transmission. P2P encryption is also vulnerable to unauthorized data disclosure (e.g., data leakage) at each device.

BRIEF SUMMARY

In some examples, communication of sensitive data between two devices may only be possible through one or more intermediary devices. For instance, the devices may be separated by various networks or the like, and in order for a first device to transmit data to another device, the data may first have to be transmitted to one or more intermediary devices. In doing so, devices in the transmission chain may each decrypt and re-encrypt the data (e.g., as conventionally performed in P2P encryption). However, performing decryption and encryption each time data is passed to an intermediary device significantly increases use of computational resources and decreases the speed of data transmission between the end devices.

Systems, apparatuses, methods, and computer program products are disclosed herein for secure key exchange. Example embodiments described herein provide for exchanging of a common key between end devices as well as all intermediary devices, after which secure communication of sensitive data can be facilitated between all devices using the common key. Other example embodiments provide for establishing a key used for secure communication between end devices without the intermediary devices gaining knowledge of the key. Further, some example embodiments provide for exchanging of a common key between end devices and intermediary devices (such that all devices may communicate through use of a single key) while also establishing a different key known only to the end devices to facilitate secure communication between the end devices.

In one example embodiment, a method is provided for secure key exchange. The method includes receiving, by communications hardware of a first device, a message from a second device. The method also includes encrypting, by data protection circuitry of the first device, the message using a first key shared between the first device and a third device, wherein the first key is derived based at least on a first random bit set known to the first device and the third device. The method also includes causing transmission, by the communications hardware of the first device, of the encrypted message to the third device.

In another example embodiment, a device is provided for secure key exchange. The device includes communications hardware configured to receive a message from a second device. The device also includes data protection circuitry configured to encrypt the message using a first key shared between the device and a third device, wherein the first key is derived based at least on a first random bit set known to the device and the third device. The communications hardware is also configured to cause transmission of the encrypted message to the third device.

In another example embodiment, a computer program product is provided for secure key exchange. The computer program product includes at least one non-transitory computer-readable storage medium storing software instructions that, when executed, cause a device to receive a message from a second device. The instructions, when executed, also cause the device to encrypt the message using a first key shared between the device and a third device, wherein the first key is derived based at least on a first random bit set known to the device and the third device. The instructions, when executed, also cause the device to cause transmission, by the communications hardware of the device, of the encrypted message to the third device.

In another example embodiment, a method is provided for secure key exchange. The method includes receiving, by communications hardware of a first device, a message from a second device, wherein the message comprises a common key that is encrypted using a first key shared between the first device and the second device, wherein the first key is derived based at least on a first random bit set known to the first device and the second device, and wherein the common key originated from a third device. The method also includes decrypting, by data protection circuitry of the first device, the message using the first key to obtain the common key. The method also includes performing, by data protection circuitry of the first device, a cryptographic data protection action using the common key.

In another example embodiment, a device is provided for secure key exchange. The device includes communications hardware configured to receive a message from a second device, wherein the message comprises a common key that is encrypted using a first key shared between the device and the second device, wherein the first key is derived based at least on a first random bit set known to the device and the second device, and wherein the common key originated from a third device. The device also includes data protection circuitry configured to decrypt the message using the first key to obtain the common key, and perform a cryptographic data protection action using the common key.

In another example embodiment, a computer program product is provided for secure key exchange. The computer program product comprising at least one non-transitory computer-readable storage medium storing software instructions that, when executed, cause a device to receive a message from a second device, wherein the message comprises a common key that is encrypted using a first key shared between the device and the second device, wherein the first key is derived based at least on a first random bit set known to the device and the second device, and wherein the common key originated from a third device. The instructions, when executed, also cause the device to decrypt the message using the first key to obtain the common key. The instructions, when executed, also cause the device to perform a cryptographic data protection action using the common key.

In another example embodiment, a method is provided for secure key exchange. The method includes generating, by key derivation circuitry of a first device, a common key based on a random bit set obtained by the first device and a second device, the second device having also generated the common key based on the random bit set. The method also includes performing, by key confirmation circuitry of the first device, a key confirmation process with a third device, the third device having derived the common key from an encrypted message received from the second device, wherein the key confirmation process confirms whether the first device and the third device each possess the common key.

In another example embodiment, a device is provided for secure key exchange. The device includes key derivation circuitry configured to generate a common key based on a random bit set obtained by the device and a second device, the second device having also generated the common key based on the random bit set. The device also includes key confirmation circuitry configured to perform a key confirmation process with a third device, the third device having derived the common key from an encrypted message received from the second device, wherein the key confirmation process confirms whether the device and the third device each possess the common key.

In another example embodiment, a computer program product is provided for secure key exchange. The computer program product comprising at least one non-transitory computer-readable storage medium storing software instructions that, when executed, cause a device to generate a common key based on a random bit set obtained by the device and a second device, the second device having also generated the common key based on the random bit set. The instructions, when executed, also cause the device to perform a key confirmation process with a third device, the third device having derived the common key from an encrypted message received from the second device, wherein the key confirmation process confirms whether the device and the third device each possess the common key.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

Overview

Figure 1:
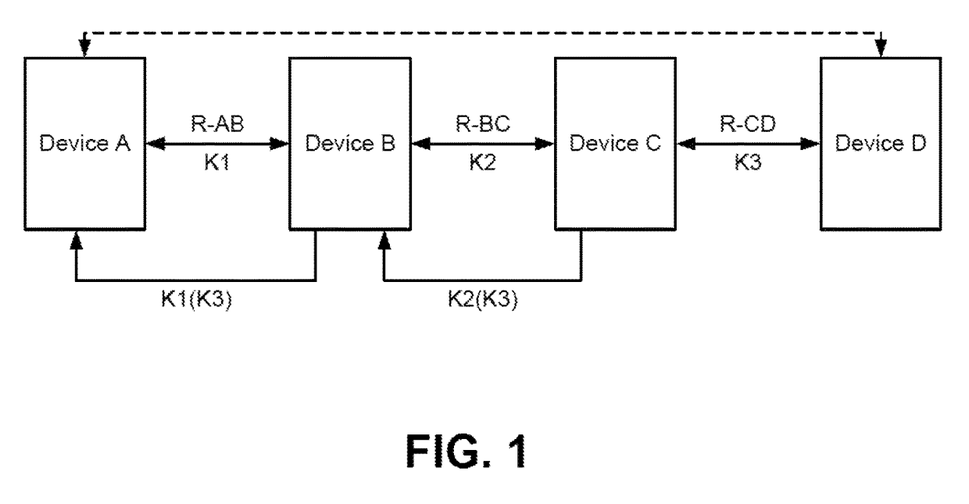
FIG. 1 illustrates an example block diagram showing a method for secure key exchange between example devices in accordance with some example embodiments described herein.

As noted above, methods, apparatuses, systems, and computer program products are described herein that provide for secure key exchange. To do so, embodiments herein combine quantum entangled random number generator (QERNG) devices with key derivation functions (KDF) and symmetric key encryption keys (KEK) to exchange a symmetric key between two communicating entities with some number of intermediary nodes. FIG. 1 provides an example high-level overview of a process for secure key exchange which establishes secure communication between devices. An example environment is shown in which two devices (Device A and Device D) need to establish a way to securely communicate with each other. In order for Device A and Device D to communicate data to each other, the data must pass through Device B and Device C.

Each communicating pair of devices may establish a random number known only to each device in the pair. For instance, Device D and Device C may establish a random number R-CD, Device B and Device C may establish a random number R-BC, and Device A and Device B may establish a random number, R-AB. In some embodiments, the random number established for each pair may be generated using a QERNG device that is shared between the pair of devices. In this regard, each random number R-AB, R-BC, and R-CD may be generated from different QERNG devices.

Using the random number, each pair of devices may derive a key by using the random number as an input to a KDF. As shown in FIG. 1, Device D and Device C may each derive K3, Device B and Device C may each derive K2, and Device A and Device B may each derive K1. At this stage, each pair of devices may securely communicate using their derived key (e.g., Device B can communicate with Device A using K1 and Device C using K2). However, Device D lacks a means to securely communicate with Device A.

To do so, for n>2 devices, the n−1 and nth entities (e.g., Device C and Device D) establish a key (e.g., K3) as discussed above. Further, for each subsequent communicating pair (e.g., Device B and Device C, Device A and Device B)) the nth key (e.g., K3) is exchanged using their derived key as a key encryption key (KEK). Said differently (and as shown in FIG. 1), Device C encrypts K3 with K2 (e.g., K2(K3)) and transmits the encrypted K3 to Device B. In some embodiments, Device B may decrypt K3 using K2 to obtain K3. Device B may then encrypt K3 using K1 and transmit the encrypted K3 to Device A, which may then decrypt K3 using K1 to obtain K3.

Thus, Device A can establish a cryptographic key with the Device D with some number of intermediary devices. In other words, the end devices (Device A and Device D) can establish a cryptographic key with cooperation from intermediary connection nodes such that the first end device (e.g., Device A) can encrypt and transmit data and the nth device (e.g., Device D) can decrypt the data without each intermediary device having to encrypt and decrypt data. In such an embodiment, each device may then possess K3 and may securely communicate with any device in the chain using K3, which is useful in situations in which the devices are trusted devices within a network of an organization or the like. However, in some cases, not all intermediary devices may be able to be trusted (e.g., some devices may be of a third party or otherwise associated with some external infrastructure). In this regard, some embodiments further discussed herein prevent intermediary devices from accessing an established key between end devices.

Accordingly, the present disclosure sets forth systems, methods, and apparatuses that provide secure key exchange to establish secure communication improve upon conventional processes (such as P2P encryption). There are many advantages of these and other embodiments described herein. For instance, embodiments herein eliminate overhead commonly incurred in conventional processes such as P2P encryption. In addition, by avoiding the need to decrypt and re-encrypt at each device, significant computational resources are saved and speed of data transmission is increased. Finally, security of communications between devices is enhanced, in that while transmission of data is streamlined and more efficient, additional complexity is added by way of the KDF and the random number (e.g., a truly random number generated by a QERNG device), making it more difficult for bad actors to gain access to any transmitted data.

Although a high level explanation of the operations of example embodiments has been provided above, specific details regarding the configuration of such example embodiments are provided below.

System Architecture

Figure 2:
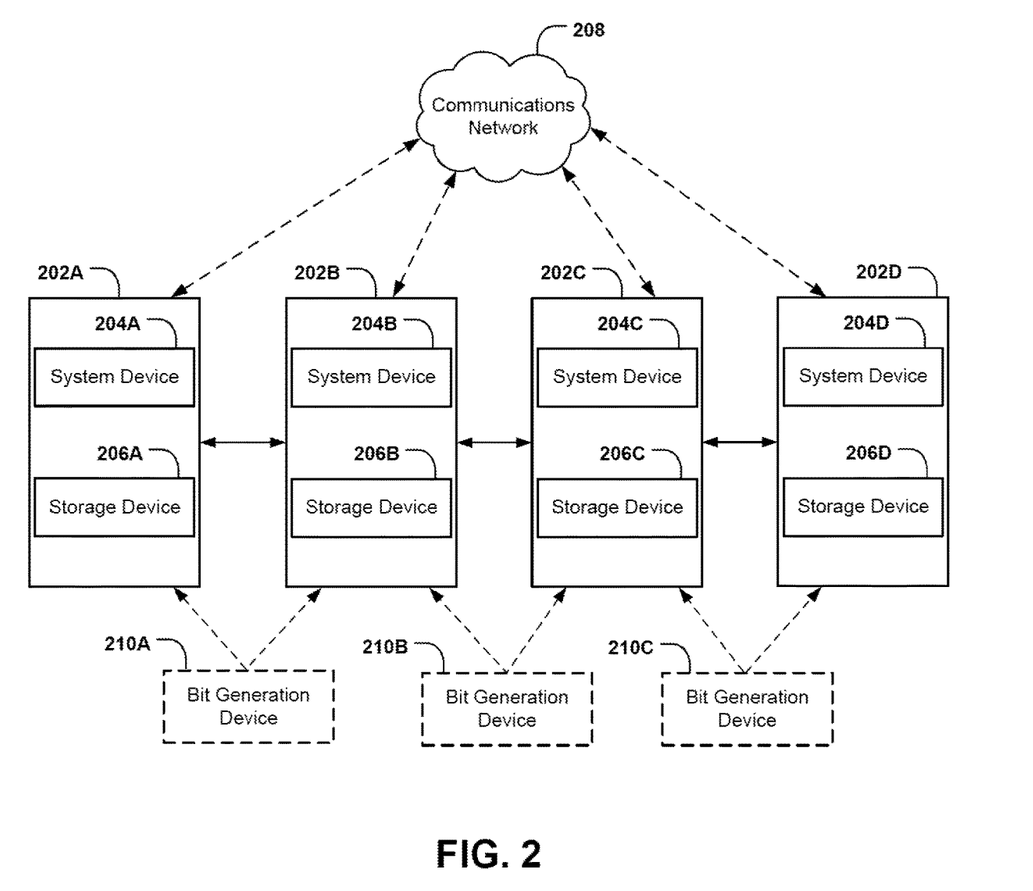
FIG. 2 illustrates a system in which some example embodiments may be used.

Example embodiments described herein may be implemented using any of a variety of computing devices or servers. To this end, FIG. 2 illustrates an example environment within which various embodiments may operate. As illustrated, the environment may include a plurality of computing devices, which may each comprise a respective system device and a respective storage device. While the example environment of FIG. 1 illustrates four computing devices, it is to be appreciated that embodiments herein may be carried out with more (or less) than four computing devices. As shown, the computing devices include a first computing device 202A which may include a system device 204A in communication with a storage device 206A. The example environment also includes a second computing device 202B which may include its own system device 204B in communication with its own storage device 206B. The example environment also includes a third computing device 202c which may include its own system device 204C in communication with its own storage device 206C. The example environment also includes a fourth computing device 202D which may include its own system device 204D in communication with its own storage device 206D. Although system devices 204A-204d and storage devices 206A-206D are described in singular form, computing devices in some embodiments may utilize more than one system device and/or more than one storage device. Additionally, in some embodiments, the computing devices 202A-202D may not require a storage device at all. Whatever the implementation, the computing devices 202A-202D, and their constituent system device(s) and/or storage device (s) may receive and/or transmit information directly with each other (e.g., via a direct cable connection, ad hoc wireless network, local area network (LAN) and/or the like) or via communications network 308 (e.g., the Internet) with any number of other devices, such as one or more additional computing devices (not shown), and/or one or more bit generation devices (e.g., bit generation devices 210A, 210B, and 210C).

System devices 204A-204D may be implemented as one or more servers, which may or may not be physically proximate to other components of their respective computing devices. Furthermore, some components of system devices 204A-204D may be physically proximate to the other components of their respective computing devices while other components are not. System devices 204A-204D may receive, process, generate, and transmit data, signals, and electronic information to facilitate the operations of their respective computing devices (e.g., computing devices 202A-202D). Particular components of system devices 204A-204D are described in greater detail below with reference to apparatus 300 in connection with FIG. 3.

Storage devices 206A, 206B, 206C, and 206d may comprise distinct components from system devices 204A-204D, or may comprise an element of system devices 204A-204D (e.g., memory 304, as described below in connection with FIG. 3). Storage devices 206A-206D may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 308). Storage devices 206A-206D may host the software executed to operate their respective computing devices. Storage devices 206A-206D may store information relied upon during operation of the computing devices 202A-202D, such as a random bit set, key derivation functions, and/or other information that may be used by the computing devices, data to be analyzed or processed using the computing devices, or the like. In addition, storage devices 206A-206D may store control signals, device characteristics, and access credentials enabling interaction between the computing devices 202A-202D and one or more of the bit generation devices 210A-210C.

The bit generation devices 210A-210C may be embodied by various computing devices known in the art. The bit generation devices 210A-210C may be capable of generating a random bit set (e.g., a pseudo-random or truly random number) and causing transmission of the random bit set to various computing devices (e.g., the computing devices 202A-202D). In some embodiments, the bit generation devices 210A-210C may cause transmission of a random bit set over the communications network 308 via a cryptographic protocol (e.g., via a Transport Layer Security (TLS) connection or the like). To generate a random bit set, the bit generation devices 210A-210C may utilize random number generator circuitry (further described below in connection with FIGS. 3 and 4), which may comprise a pseudo-random number generator (RNG) or, in some embodiments, a QERNG, which may generate a truly random number.

The first computing device 202A, second computing device 202B, third computing device 202C, and fourth computing device 202D may be embodied by any computing devices known in the art, such as desktop or laptop computers, tablet devices, smartphones, server devices (e.g., a secure data center or other device hosted within the secure network infrastructure of an organization or entity), point-of-sale (POS) devices, or the like. Moreover, the computing devices 202A-202D need not themselves be independent devices, but may be peripheral devices communicatively coupled to other computing devices.

Example Implementing Apparatuses

Figure 3:
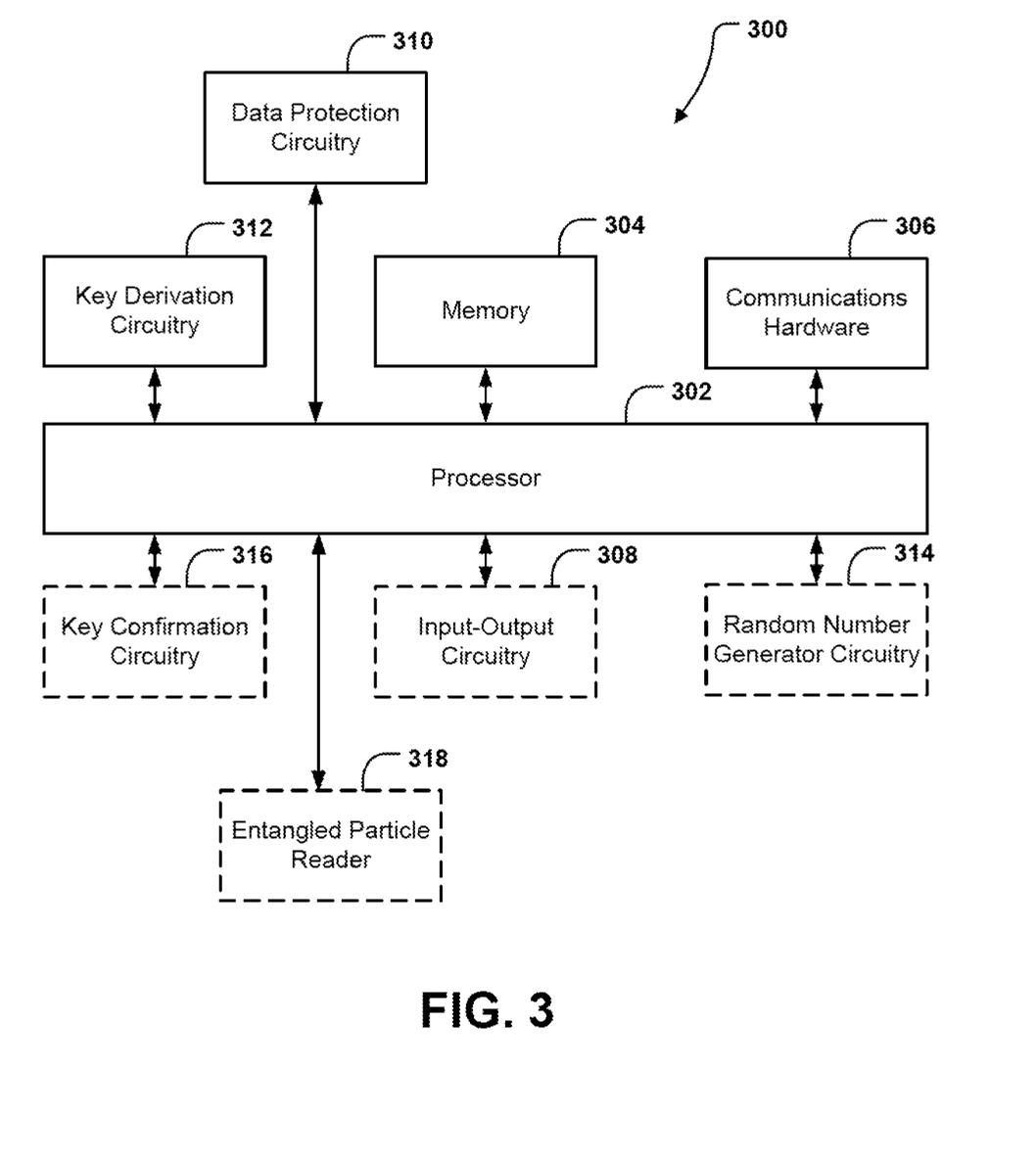
FIG. 3 illustrates a schematic block diagram of example circuitry embodying a device that may perform various operations in accordance with some example embodiments described herein.

System devices 204A-204D of the computing devices 202A-202D (described previously with reference to FIG. 2) may each be embodied by one or more computing devices or servers, shown as apparatus 300 in FIG. 3. As illustrated in FIG. 3, the apparatus 300 may include processor 302, memory 304, communications hardware 306, input-output circuitry 308, data protection circuitry 310, key derivation circuitry 312, random number generator circuitry 314, and key confirmation circuitry 316, each of which will be described in greater detail below. While the various components are only illustrated in FIG. 3 as being connected with processor 402, it will be understood that the apparatus 300 may further comprises a bus (not expressly shown in FIG. 3) for passing information amongst any combination of the various components of the apparatus 300. The apparatus 300 may be configured to execute various operations described above in connection with FIGS. 1 and 2 and below in connection with FIGS. 5-8.

The processor 302 (and/or co-processor or any other processor assisting or otherwise associated with the processor) may be in communication with the memory 304 via a bus for passing information amongst components of the apparatus. The processor 302 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 300, remote or "cloud" processors, or any combination thereof.

The processor 302 may be configured to execute software instructions stored in the memory 304 or otherwise accessible to the processor (e.g., software instructions stored on a separate storage device (e.g., one of storage devices 206A-206D, as illustrated in FIG. 2). In some cases, the processor may be configured to execute hard-coded functionality. As such, whether configured by hardware or software methods, or by a combination of hardware with software, the processor 302 represents an entity (e.g., physically embodied in circuitry) capable of performing operations according to various embodiments of the present invention while configured accordingly. Alternatively, as another example, when the processor 302 is embodied as an executor of software instructions, the software instructions may specifically configure the processor 302 to perform the algorithms and/or operations described herein when the software instructions are executed.

Memory 304 is non-transitory and may include, for example, one or more volatile and/or non-volatile memories. In other words, for example, the memory 304 may be an electronic storage device (e.g., a computer readable storage medium). The memory 304 may be configured to store information, data, content, applications, software instructions, or the like, for enabling the apparatus to carry out various functions in accordance with example embodiments contemplated herein.

The communications hardware 306 may be any means such as a device or circuitry embodied in either hardware or a combination of hardware and software that is configured to receive and/or transmit data from/to a network and/or any other device, circuitry, or module in communication with the apparatus 300. In this regard, the communications hardware 306 may include, for example, a network interface for enabling communications with a wired or wireless communication network. For example, the communications hardware 306 may include one or more network interface cards, antennas, buses, switches, routers, modems, and supporting hardware and/or software, or any other device suitable for enabling communications via a network. Furthermore, the communications hardware 306 may include the processor for causing transmission of such signals to a network or for handling receipt of signals received from a network. In some embodiments, the communications hardware 306 may include, for example, interfaces such as one or more ports (e.g., a laser port, a fiber-optic cable port, and/or the like) for enabling communications with other devices.

The apparatus 300 may include input-output circuitry 308 configured to provide output to a user and, in some embodiments, to receive an indication of user input. It will be noted that some embodiments will not include input-output circuitry 308, in which case user input may be received via a separate device such as a separate client device or the like. The input-output circuitry 308 may comprise a user interface, such as a display, and may further comprise the components that govern use of the user interface, such as a web browser, mobile application, dedicated client device, or the like. In some embodiments, the input-output circuitry 308 may include a keyboard, a mouse, a touch screen, touch areas, soft keys, a microphone, a speaker, and/or other input/output mechanisms. The input-output circuitry 308 may utilize the processor 302 to control one or more functions of one or more of these user interface elements through software instructions (e.g., application software and/or system software, such as firmware) stored on a memory (e.g., memory 304) accessible to the processor 302.

In addition, the apparatus 300 further comprises data protection circuitry 310 that performs cryptographic data protection actions using cryptographic keys. The data protection circuitry 310 may utilize processor 302, memory 304, or any other hardware component included in the apparatus 300 to perform these operations, as described in connection with FIGS. 5-8 below. The data protection circuitry 310 may further utilize communications hardware 306 to gather data from a variety of sources (e.g., other computing devices such as one or more of the computing devices 202A-202D, as shown in FIG. 2), may utilize input-output circuitry 308 to receive data from a user, and in some embodiments may utilize processor 302 and/or memory 304 to perform cryptographic data protection actions including but not limited to encrypting data using a cryptographic key, decrypting encrypted data using a cryptographic key, and/or perform other cryptographic data protection actions.

In addition, the apparatus 300 further comprises key derivation circuitry 312 that derives cryptographic keys (e.g., using a random bit set and a KDF). The key derivation circuitry 312 may utilize processor 302, memory 304, or any other hardware component included in the apparatus 300 to perform these operations, as described in connection with FIGS. 5-8 below. The key derivation circuitry 312 may further utilize communications hardware 306 to gather data from a variety of sources (e.g., bit generation devices 210A-210C, as shown in FIG. 2), may utilize input-output circuitry 308 to receive data from a user, and in some embodiments may utilize processor 302 and/or memory 404 to derive cryptographic keys via one or more KDFs.

In some embodiments, the apparatus 300 may optionally also comprise random number generator circuitry 314 that generates a random bit set. The number generator circuitry 314 may utilize processor 302, memory 304, or any other hardware component included in the apparatus 300 to perform these operations, as described in connection with FIGS. 5-8 below. The random number generator circuitry 314 may further utilize communications hardware 306 to gather data from a variety of sources (e.g., one or more computing devices 202A-202D, as shown in FIG. 2), may utilize input-output circuitry 208 to receive data from a user, and in some embodiments may utilize processor 202 and/or memory 204 to generate a random bit set.

In addition, in some embodiments, the apparatus 300 may optionally further comprise key confirmation circuitry 316 that generates and compares key check values and determines whether the key check values match. In some embodiments, the key confirmation circuitry 316 may be configured to generate key check values. The key confirmation circuitry 316 may utilize processor 302, memory 304, or any other hardware component included in the apparatus 300 to perform these operations, as described in connection with FIGS. 5-8 below. The key confirmation circuitry 316 may further utilize communications hardware 306 to gather data from a variety of sources (e.g., computing devices 202A-202B, as shown in FIG. 2), may utilize input-output circuitry 308 to receive data from a user, and in some embodiments may utilize processor 302 and/or memory 304 to perform a key confirmation process, which may involve determining whether a first key check value matches a second key check value.

In some embodiments, the apparatus 300 may optionally also comprise an entangled particle reader 318 that measures entangled particles to generate a random bit set. The entangled particle reader 318 may utilize processor 302, memory 304, or any other hardware component included in the apparatus 400 to perform these operations, as described in connection with FIGS. 5-8 below. The entangled particle reader 318 may further utilize communications hardware 306 to gather data from a variety of sources (e.g., storage devices 206A-206D, as shown in FIG. 2), may utilize input-output circuitry 308 to receive data from a user, and in some embodiments may utilize processor 302 and/or memory 304 to measure entangled particles (e.g., received from a bit generation device such as a QERNG device) and generate a random bit set based on the measurement of the entangled particles. The entangled particle reader 318 may be any means such as one or more devices or circuitry embodied in either hardware or a combination of hardware and software that is configured to measure entangled particles and generate a random bit set. The entangled particles may be measured to obtain a random bit set (e.g., in the form of a sequence of true random numbers).

Although components 302-318 are described in part using functional language, it will be understood that the particular implementations necessarily include the use of particular hardware. It should also be understood that certain of these components 302-318 may include similar or common hardware. For example, the data protection circuitry 310, key derivation circuitry 312, random number generator circuitry 314, key confirmation circuitry 316, and entangled particle reader 318 may each at times leverage use of the processor 302, memory 304, communications hardware 306, or input-output circuitry 308, such that duplicate hardware is not required to facilitate operation of these physical elements of the apparatus 300 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" and should be understood broadly to include hardware, in some embodiments, the terms "circuitry" may in addition refer to software instructions that configure the hardware components of the apparatus 300 to perform the various functions described herein.

Although the data protection circuitry 310, key derivation circuitry 312, random number generator circuitry 314, key confirmation circuitry 316, and entangled particle reader 318 may leverage processor 302, memory 304, communications hardware 306, or input-output circuitry 308 as described above, it will be understood that any of these elements of apparatus 300 may include one or more dedicated processor, specially configured field programmable gate array (FPGA), or application specific interface circuit (ASIC) to perform its corresponding functions, and may accordingly leverage processor 302 executing software stored in a memory (e.g., memory 304), or memory 304, communications hardware 306 or input-output circuitry 308 for enabling any functions not performed by special-purpose hardware elements. In all embodiments, however, it will be understood that the data protection circuitry 310, key derivation circuitry 312, random number generator circuitry 314, and key confirmation circuitry 316 are implemented via particular machinery designed for performing the functions described herein in connection with such elements of apparatus 300.

Figure 4:
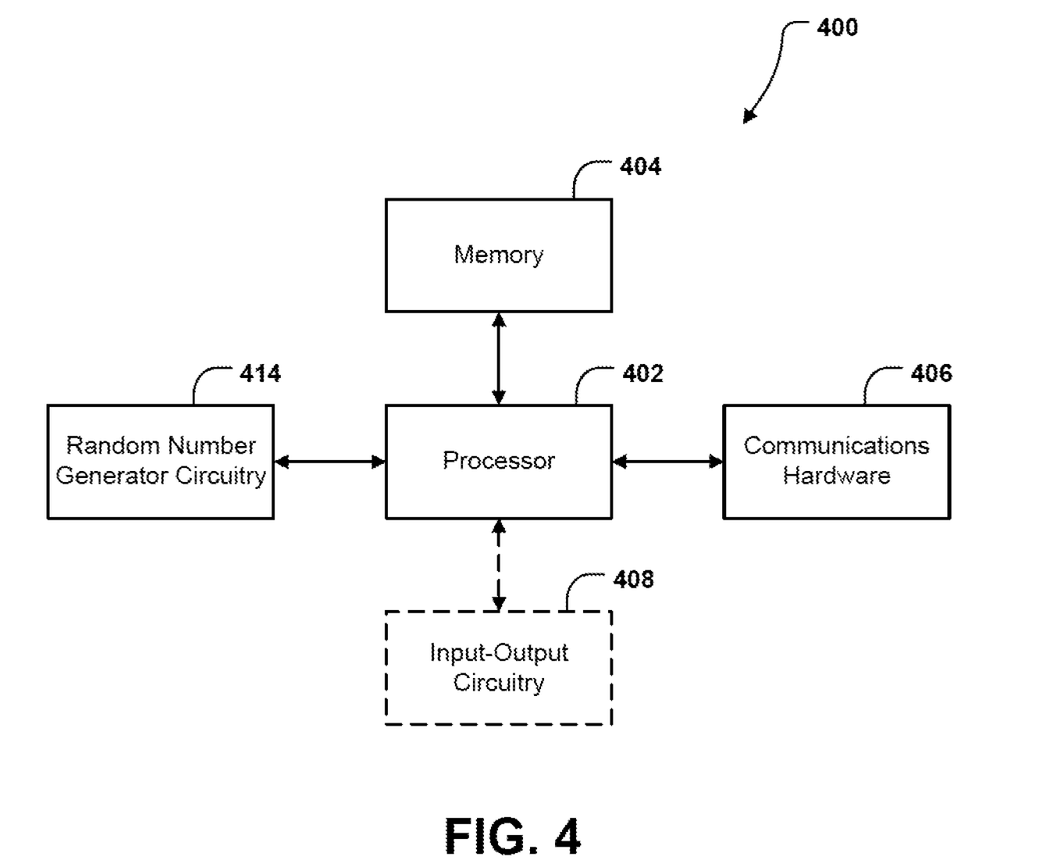
FIG. 4 illustrates a schematic block diagram of example circuitry embodying a bit generation device that may be employed to perform various operations in accordance with some example embodiments described herein.

As illustrated in FIG. 4, an apparatus 400 is shown that represents an example bit generation device (e.g., bit generation devices 210A-210C). The apparatus 400 includes processor 402, memory 404, communications hardware 406, and random number generator circuitry 414, and may optionally include input-output circuitry 408, each of which is configured to be similar to the similarly named components described above in connection with FIG. 3.

In some embodiments, various components of the apparatuses 300 and 400 may be hosted remotely (e.g., by one or more cloud servers) and thus need not physically reside on the corresponding apparatus 300 or 400. Thus, some or all of the functionality described herein may be provided by third party circuitry. For example, a given apparatus 300 or 400 may access one or more third party circuitries via any sort of networked connection that facilitates transmission of data and electronic information between the apparatus 300 or 400 and the third party circuitries. In turn, that apparatus 300 or 400 may be in remote communication with one or more of the other components describe above as comprising the apparatus 300 or 400.

As will be appreciated based on this disclosure, example embodiments contemplated herein may be implemented by apparatus 300. Furthermore, some example embodiments may take the form of a computer program product comprising software instructions stored on at least one non-transitory computer-readable storage medium (e.g., memory 304). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 300 as described in FIG. 3 or apparatus 400 as described in FIG. 4, that loading the software instructions onto a computing device or apparatus produces a special-purpose machine comprising the means for implementing various functions described herein.

Having described specific components of example apparatuses 300 and 400, example embodiments are described below in connection with a series of flowcharts.

Example Operations

Turning to FIGS. 5-8, example flowcharts are illustrated that contain example operations implemented by example embodiments described herein. The operations illustrated in FIGS. 5-8 may, for example, be performed by various system devices 204A-204D of the computing devices 202A-202D shown in FIG. 2, which may in turn be embodied by an apparatus 300, which is shown and described in connection with FIG. 3. To perform the operations described below, the apparatus 300 may utilize one or more of processor 302, memory 304, communications hardware 306, input-output circuitry 308, data protection circuitry 310, key derivation circuitry 312, random number generator circuitry 314, key confirmation circuitry 316, entangled particle reader 318, and/or any combination thereof. It will be understood that user interaction with one or more of the computing devices 202A-202D may occur directly via input-output circuitry 308, or may instead be facilitated by a separate client device or the like, and which may have similar or equivalent physical componentry facilitating such user interaction.

Figure 5:
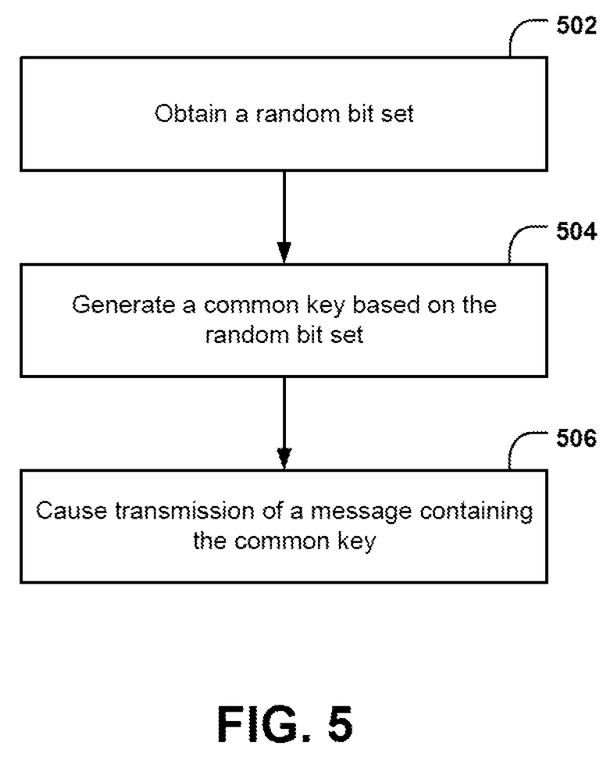
FIG. 5 illustrates an example flowchart for secure key exchange, in accordance with some example embodiments described herein.

To simplify explanation, reference will be made to the various computing devices 202A-202D of FIG. 2 as performing various operations of FIGS. 5-8. Turning first to FIG. 5, example operations are shown for secure key exchange. While these operations may be performed by any of the computing devices 202A-202D, in some embodiments and to simplify explanation, the operations of FIG. 5 may be performed by, for example, computing device 202D of FIG. 2.

As shown by operation 502, the apparatus 300 includes means, such as processor 302, memory 304, communications hardware 306, random number generator circuitry 314, or the like, for obtaining a random bit set. The random bit set may also be obtained by another device (e.g., computing device 202C). In some embodiments, the random bit set may comprise a random number (e.g., a random string of bits (e.g., a string of zeroes and ones).

The random bit set may be obtained in various ways. In some embodiments, the random bit set may be transmitted to computing devices 202C and 202D from a bit generation device (e.g., bit generation device 210C, as described above in connection with FIG. 2). For example, in some embodiments bit generation device 210C may generate a random bit set and cause transmission of the random bit set to computing device 202C and computing device 202D. In some embodiments, the bit generation device 210C may be a QERNG device. In this regard, in order to generate the random bit set, the bit generation device 210C may do so using quantum entangled random number generation to produce a truly random number.

In some embodiments, the random bit set may be transmitted to each of the computing devices 202C and 202D in response to a request from at least one of the computing devices. For instance, at least one of the computing devices 202C and 202D may cause transmission of a request for the random bit set to the bit generation device 210C. In this regard, the apparatus 300 includes means, such as processor 302, memory 304, communications hardware 306, or the like, for causing transmission of a request for a random bit set. The request may include an indication of computing device(s) (e.g., a device identifier, IP address, or the like) which the bit generation device is to send the random bit set to. For example, computing device 202D may send a request to the bit generation device 210C requesting a random bit set be transmitted to the computing device 202D and the computing device 202C.

In some embodiments, rather than using a separate bit generation device 210C, the random bit set may be obtained through generation of the random bit set at one of the computing devices 202C or 202D. In this regard, the apparatus 300 may include means, such as processor 302, memory 304, random number generator circuitry 314, or the like, for generating a random bit set. For instance, the random number generator circuitry 314 may generate a random bit set in the form of pseudo-random number or, in some embodiments, a truly random number through quantum random number generation. The random bit set may be transmitted to the corresponding device. For example, computing device 202D may generate the random bit set and cause transmission of the random bit set to computing device 202C. In this regard, the apparatus 300 may include means such as processor 302, memory 304, communications hardware 306, and/or the like, for causing transmission of a random bit set.

As shown by operation 504, the apparatus 300 includes means, such as processor 302, memory 304, key derivation circuitry 312, or the like, for generating a common key based on the random bit set. The common key may be derived using a key derivation function (KDF) that uses the random bit set as an input to the KDF. For example, each of the computing devices 202C and 202D may use the same KDF to each derive the common key using the random bit set obtained by the computing devices. In this regard, the particular KDF used by each of the computing devices 202C and 202D to derive the common key may be predetermined in a prior agreement between the devices.

As shown by operation 506, the apparatus 300 includes means, such as processor 302, memory 304, communications hardware 306, or the like, for causing transmission of a message containing the common key. For example, the computing device 202D may cause transmission of a message containing the common key to the computing device 202C. In some embodiments, the message may indicate a transmission path (e.g., one or more devices which the message is to be delivered to). In some embodiments, the purpose of the message may be to provide the common key to another device. For example, computing device 202D may need to communicate information to computing device 202A, and the message containing the common key may be transmitted over intermediary devices 202B and 202C in order for computing device 202A to obtain the common key.

Figure 6:
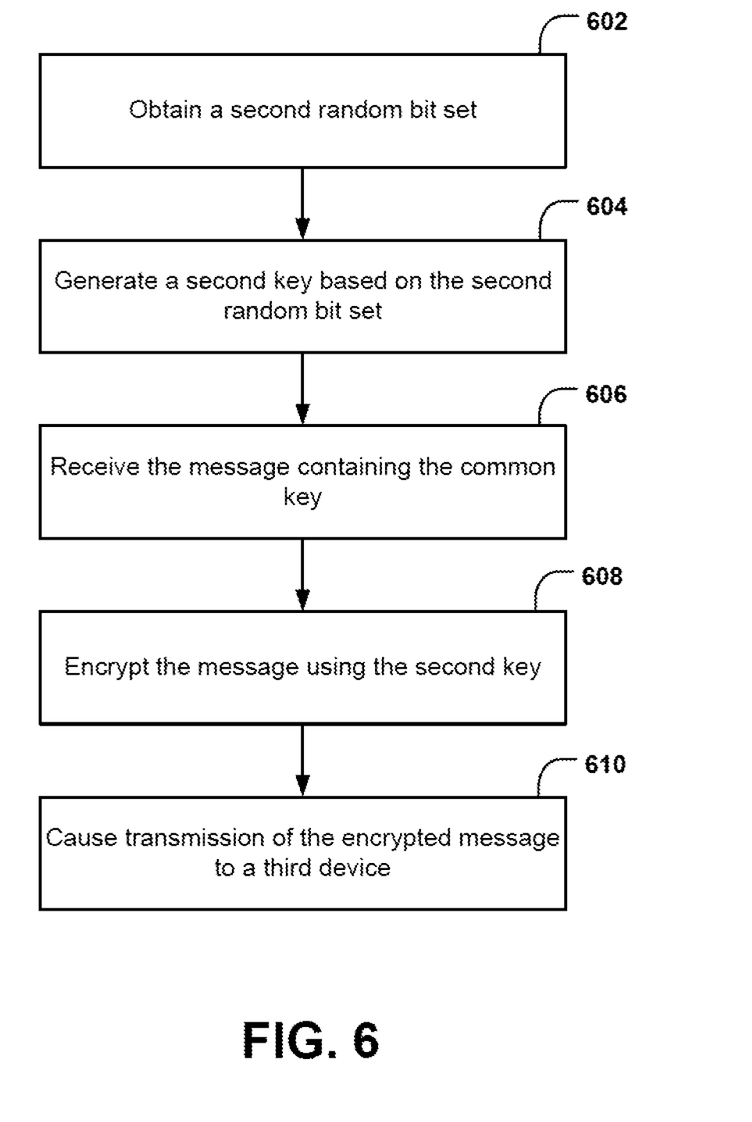
FIG. 6 illustrates an example flowchart for secure key exchange, in accordance with some example embodiments described herein.

Turning to FIG. 6, example operations are shown for secure key exchange. While these operations may be performed by any of the computing devices 202A-202D, in some embodiments and to simplify explanation, the operations of FIG. 6 may be performed by, for example, computing device 202C of FIG. 2.

As described above, computing device 202C (e.g., an intermediary device between computing devices 202A and 202D) also obtains the same random bit set as computing device 202D and derives the same common key. However, being an intermediary device, computing device 202C may also derive a second key to communicate with another intermediary device (e.g., computing device 202B). As shown by operation 602, the apparatus 300 includes means, such as processor 302, memory 304, communications hardware 306, random number generator circuitry 314, or the like, for obtaining a second random bit set. The second random bit set may also be obtained by another device (e.g., computing device 202B). Similar to the random bit set described above in connection with FIG. 5, the second random bit set may comprise a random number (e.g., a random string of bits (e.g., a string of zeroes and ones).

In some embodiments, the second random bit set may be transmitted to computing devices 202C and 202B from a bit generation device (e.g., bit generation device 210B, as described above in connection with FIG. 2). For example, in some embodiments bit generation device 210B may generate a random bit set and cause transmission of the random bit set to computing device 202C and computing device 202B. In this regard, computing device 202C may be in communication with two bit generation devices 210C and 210B, each of which are in communication with a respective pair of computing devices.

Similar to bit generation device 210C, the bit generation device 210B may be a QERNG device, in which case the second bit set may comprise a truly random number. In some embodiments, the second random bit set may be transmitted to each of the computing devices 202C and 202B in response to a request from at least one of the computing devices. For instance, at least one of the computing devices 202C and 202B may cause transmission of a request for the random bit set to the bit generation device 210B. The request may include an indication of computing device(s) which the bit generation device is to send the random bit set to. For example, computing device 202C may send a request to the bit generation device 210B requesting a random bit set be transmitted to the computing device 202B and the computing device 202C.

In some embodiments, rather than using a separate bit generation device 210B, the random bit set may be obtained through generation of the random bit set at one of the computing devices 202C or 202B. For instance, the random number generator circuitry 314 may generate a random bit set in the form of pseudo-random number or, in some embodiments, a truly random number through quantum random number generation. The random bit set may be transmitted to the corresponding device. For example, computing device 202C may generate the random bit set and cause transmission of the random bit set to computing device 202B.

As shown by operation 604, the apparatus 300 includes means, such as processor 302, memory 304, key derivation circuitry 312, or the like, for generating a second key based on the second random bit set. The second key may be derived using a KDF that uses the random bit set as an input to the KDF. For example, each of the computing devices 202C and 202B may use the same KDF to each derive the second key using the second random bit set obtained by the computing devices. In this regard, the particular KDF used by each of the computing devices 202C and 202B to derive the second key may be predetermined in a prior agreement between the devices. In some embodiments, the KDF used to derive the second key may be the same KDF used to derive the common key. In some embodiments, the KDF may be different from the KDF used to derive the common key. For example, computing device 202C may utilize multiple KDFs, and when deriving the common key with computing device 202D, a first KDF may be used, and when deriving the second key with computing device 202B, a second KDF, different from the first KDF, may be used. Usage of different KDFs to derive keys between the computing devices may enhance security and increase difficulty for bad actors gain access to any encrypted data transmitted between the devices.

At operation 606, the apparatus 300 includes means, such as processor 302, memory 304, communications hardware 306, or the like, for receiving the message containing the common key. The message may be received from computing device 202D. As described above, the message may indicate computing device 202A as the destination recipient of the common key. In this regard, device 202C may cause transmission of the message to device 202B, and device 202B may then cause transmission of the message to 202A. In order to send the message to device 202B, computing device 202C may first encrypt the message using the second key, which is known to both computing device 202C and computing device 202B.

At operation 608, the apparatus 300 includes means, such as processor 302, memory 304, data protection circuitry 310, or the like, for encrypting the message using the second key. In this regard, the common key may be encrypted using the second key, such that the second key serves as a key encryption key (KEK). At operation 610, the apparatus 300 includes means, such as processor 302, memory 304, communications hardware 306, or the like, for causing transmission of the encrypted message to a third device. For example, once computing device 202C encrypts the message containing the common key with the second key, computing device 202C may cause transmission of the encrypted message to computing device 202B.

Figure 7:
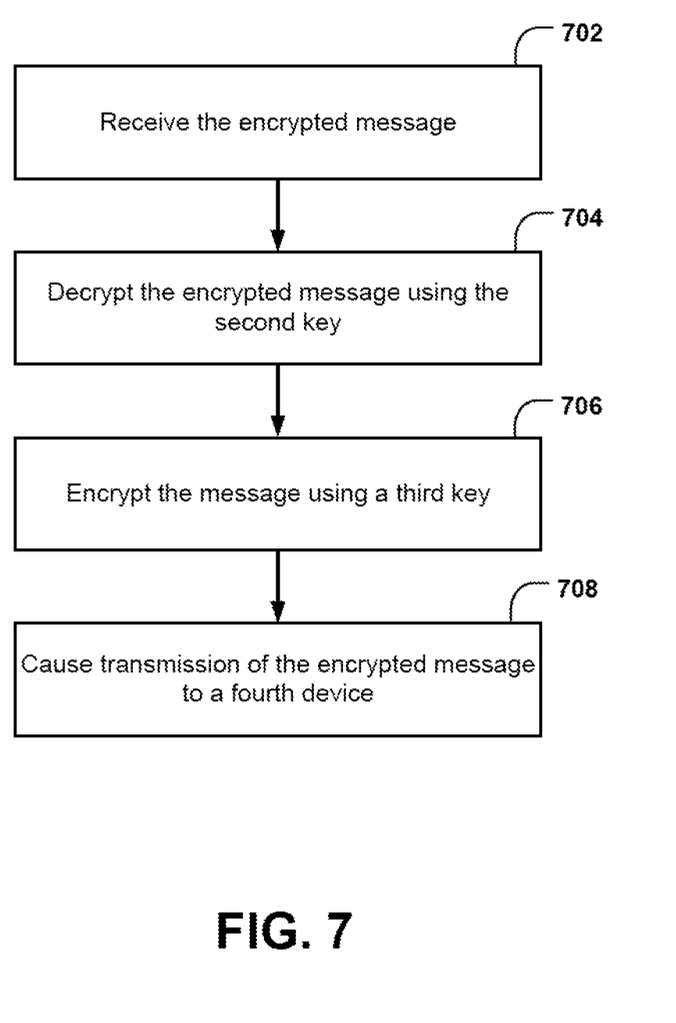
FIG. 7 illustrates an example flowchart for secure key exchange, in accordance with some example embodiments described herein.

In some embodiments, as computing device 202B has also derived the second key (using the second random bit set obtained by both computing device 202B and computing device 202C), computing device 202B is able to decrypt the encrypted message (e.g., to obtain the common key) using the second key. Turning to FIG. 7, example operations are shown for secure key exchange. While these operations may be performed by any of the computing devices 202A-202D, in some embodiments and to simplify explanation, the operations of FIG. 7 may be performed by, for example, computing device 202B of FIG. 2.

At operation 702, the apparatus 300 includes means, such as processor 302, memory 304, communications hardware 306, or the like, for receiving the encrypted message containing the common key. As described above, the encrypted message may be received from computing device 202C after having been encrypted using the second key shared between computing device 202C and computing device 202B.

In order to send the message to its intended destination (device 202A), computing device 202B may first decrypt the encrypted the message using the second key. In this regard, as shown by operation 704, the apparatus 300 includes means, such as processor 302, memory 304, data protection circuitry 310, or the like, for decrypting the encrypted message using the second key. After decrypting the encrypted message, computing device 202B may obtain the common key. Computing device 202B may then use another key (e.g., a third key), to encrypt the message in order to securely transmit the message to computing device 202A.

Similar to derivation of the common key and the second key as described above, the third key may be a key that is derived by computing device 202B and computing device 202A based on a third random bit set which is obtained by both computing device 202B and computing device 202A.

In some embodiments, the third random bit set may be transmitted to computing devices 202B and 202A from a bit generation device (e.g., bit generation device 210A, as described above in connection with FIG. 2). For example, in some embodiments bit generation device 210A may generate the third random bit set and cause transmission of the third random bit set to computing device 202B and computing device 202A. In this regard, computing device 202B may be in communication with two bit generation devices 210B and 210A, each of which are in communication with a respective pair of computing devices.

Similar to bit generation devices 210C and 210B, the bit generation device 210A may be a QERNG device, in which case the third bit set may comprise a truly random number. In some embodiments, the third random bit set may be transmitted to each of the computing devices 202B and 202A in response to a request from at least one of the computing devices. For instance, at least one of the computing devices 202B and 202A may cause transmission of a request for the random bit set to the bit generation device 210A. The request may include an indication of computing device(s) which the bit generation device 210A is to send the random bit set to. For example, computing device 202B may send a request to the bit generation device 210A requesting a random bit set be transmitted to the computing device 202B and the computing device 202A.

In some embodiments, rather than using a separate bit generation device 210A, the random bit set may be obtained through generation of the random bit set at one of the computing devices 202B or 202A. For instance, the random number generator circuitry 314 may generate the third random bit set in the form of pseudo-random number or, in some embodiments, a truly random number through quantum random number generation. The third random bit set may be transmitted to the corresponding device. For example, computing device 202B may generate the third random bit set and cause transmission of the third random bit set to computing device 202A.

The third key may then be derived by both the computing devices 202B and 202A. The third key may be derived using a KDF that uses the third random bit set as an input to the KDF. For example, each of the computing devices 202B and 202A may use the same KDF to each derive the third key using the third random bit set obtained by the computing devices. In this regard, the particular KDF used by each of the computing devices 202B and 202A to derive the second key may be predetermined in a prior agreement between the devices. In some embodiments, the KDF used to derive the third key may be the same KDF used to derive the common key and/or the second key. In some embodiments, the KDF may be different from the KDF used to derive the common key and/or the second key.

As shown by operation 706, the apparatus 300 includes means, such as processor 302, memory 304, data protection circuitry 310, or the like, for encrypting the message using a third key. In this regard, the common key may be re-encrypted using the third key, such that the third key serves as a key encryption key (KEK).

In some embodiments, it may be undesirable for some intermediary devices (such as computing device 202B) to obtain the common key. For example, the common key may be intended to only be known to certain computing devices. To prevent certain intermediary devices from obtaining the common key (e.g., by directly decrypting an encrypted message containing the common key), cryptographic hardware modules (CHM) may be employed at particular intermediary devices to prevent the intermediary devices from obtaining the common key. A CHM, also referred to as a secure cryptographic device (SCD) or hardware security module (HSM), may comprise a hardened, tamper-resistant hardware device that secure cryptographic processes by protecting and managing keys. For example, in some embodiments, the CHM may be physically connected to an intermediary computing device (e.g., an on-premises deployment). In some embodiments, the CHM may be a cloud-based CHM. Whatever the implementation, the CHM may operate within a secure boundary of memory distinct from a memory of the intermediary device (e.g., memory 304). Said differently, the CHM may be used to perform a key translation (e.g., decrypting with one key and re-encrypting with another key) of the common key without the common key ever being exposed to the memory of the intermediary device. For example, the CHM may perform the key translation by decrypting the message containing the common key (e.g., with the second key), encrypting the message with the third key, and providing the encrypted message to the intermediary device (e.g., computing device 202B). In this regard, in some embodiments, encrypting the message using the first key (e.g., by computing device 202B) may comprise performing, by a cryptographic hardware module associated with the device, a key translation. The key translation may comprise decrypting the message and encrypting the decrypted message within a secure boundary of a memory of the cryptographic hardware module.

At operation 708, the apparatus 300 includes means, such as processor 302, memory 304, communications hardware 306, or the like, for causing transmission of the encrypted message to a fourth device. For example, once computing device 202B encrypts the message containing the common key with the third key, computing device 202B may cause transmission of the encrypted message to computing device 202A.

Figure 8:
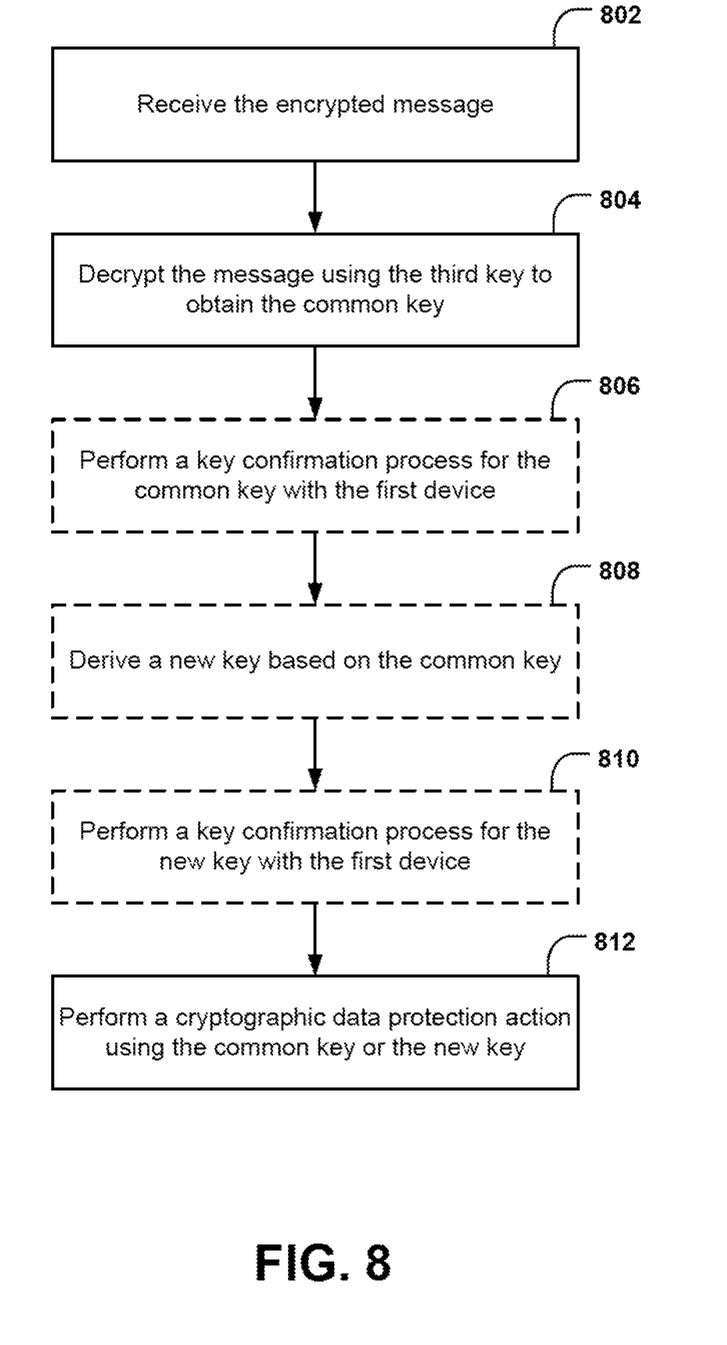
FIG. 8 illustrates an example flowchart for secure key exchange, in accordance with some example embodiments described herein.

In some embodiments, as computing device 202A has also derived the third key (using the third random bit set obtained by both computing device 202B and computing device 202A), computing device 202A is able to decrypt the encrypted message (e.g., to obtain the common key) using the third key. Turning to FIG. 8, example operations are shown for secure key exchange. While these operations may be performed by any of the computing devices 202A-202D, in some embodiments and to simplify explanation, the operations of FIG. 8 may be performed by, for example, computing device 202A of FIG. 2.

At operation 802, the apparatus 300 includes means, such as processor 302, memory 304, communications hardware 306, or the like, for receiving the encrypted message containing the common key. As described above, the encrypted message may be received from computing device 202B after having been encrypted using the third key shared between computing device 202B and computing device 202A.

As shown by operation 704, the apparatus 300 includes means, such as processor 302, memory 304, data protection circuitry 310, or the like, for decrypting the encrypted message using the third key. After decrypting the encrypted message, computing device 202A may obtain the common key. At this point, in some embodiments (e.g., embodiments in which intermediary devices obtain the common key through decryption not involving a CHM), each of the computing devices 202A, 202B, 202C, and 202D now possess the common key. In this regard, the common key may now be used to perform various cryptographic data protection actions such as encrypting and decrypting data transmitted between the computing devices 202A-202D. Moreover, each computing device now possesses a key (e.g., the common key) which can be used to securely communicate with any of the other computing devices. This may be beneficial in situations in which each of the computing devices 202A-202D is a trusted computing device (e.g., operated by a single entity or the like).

In some embodiments, prior to performing cryptographic data protection actions using the common key, a key confirmation process may be performed in order to confirm that the computing devices have successfully derived the same common key. In other words, the devices may confirm with each other that the common key was not somehow altered during the transmission and/or various encryptions and decryptions of the common key. In this regard, as shown by operation 806, the apparatus 300 may include means, such as processor 302, memory 304, key confirmation circuitry 316, or the like, for performing a key confirmation process for the common key with the first device. For example, computing device 202A may perform a key confirmation process with computing device 202D (e.g., the computing device having originally sent the message comprising the common key).

In some embodiments, the key confirmation process may comprise each of the computing devices 202A and 202D generating a key check value (KCV) based on the common key and comparing the generated KCVs to confirm that the KCVs match. A KCV is a non-secret value that is cryptographically derived from a key (e.g., the common key) and is used to verify that the underlying value is as expected. For example, once the common key is obtained at the computing device 202A as described above, computing device 202A may generate a KCV that is based on the common key and cause transmission of the KCV to computing device 202D (e.g., through the intermediary computing devices 202B and 202C). In this regard, the apparatus 300 may include means, such as processor 302, memory 304, key confirmation circuitry 316, or the like, for generating a key check value based on the common key. The apparatus 300 may also include means, such as processor 302, memory 304, communications hardware 306, or the like, for causing transmission of the key check value. Computing device 202D may also generate a KCV based on the common key. The KCV generated by computing device 202A may then be compared with the KCV generated by computing device 202B to ensure that the KCVs match. In this regard, the apparatus 300 may also include means, such as processor 302, memory 304, key confirmation circuitry 316, or the like, for comparing a first key check value with a second key check value.

If the KCVs match, it can be assumed that the end computing devices 202A and 202D (as well as all intermediary devices, e.g., computing devices 202B and 202C) have each correctly obtained the same common key. In an instance in which the KCVs match, a confirmation message confirming the match may be transmitted. For example, computing device 202D may cause transmission of a confirmation message or the like to computing device 202A confirming the match. In an instance in which the KCVs do not match, the confirmation message may indicate that the KCVs do not match. In this case, another attempt may be made to transmit the common key from computing device 202D to computing device 202A. For example, operation 506 of FIG. 5, the operations of FIGS. 6 and 7, and operations 802-804 may be performed again until it may be established that both end devices possess the same common key.

In some embodiments, various intermediary devices may be associated with an external infrastructure, a third party, and/or otherwise not trusted. In this regard, once all computing devices have obtained the common key, it may be desired for the end devices (e.g., computing devices 202A and 202D) to securely communicate data without the intermediary devices (e.g., computing devices 202B and 202C) gaining knowledge of the data. To do so, both computing device 202A and computing device 202D may derive a new key based on the common key. As shown by operation 808, the apparatus 300 includes means, such as processor 302, memory 304, key derivation circuitry 312, or the like, for deriving a new key based on the common key.

In some embodiments, the new key may be derived based on the common key and a predetermined parameter set known only to computing device 202A and computing device 202D. For example, in some embodiments, the predetermined parameter set may comprise a shared secret between the two computing devices. For example, the predetermined parameter set may be a password or the like previously established between the two computing devices. The common key and the predetermined parameter set may be provided as inputs to a KDF in order to derive the new key. The KDF used to derive the new key may be the same KDF used to derive the common key. In some embodiments, the KDF used to derive the new key may be a different KDF than the KDF used to derive the common key. Use of a different KDF to derive the new key may provide an additional layer of security. In this regard, if an intermediary device (which has already obtained the common key) were to somehow obtain the predetermined parameter set, the intermediary device would still be required to know the specific KDF used to derive the new key.

Once the new key is derived at computing device 202A and computing device 202B, the new key may be used to perform various cryptographic data protection actions. For example, computing device 202A may encrypt data using the new key and cause transmission of the encrypted data to computing device 202D (e.g., via intermediary computing devices 202B and 202C). Computing device 202D may then decrypt the data using the new key. As the new key is unknown to the intermediary computing devices 202C and 202D, they are unable to decrypt the data, and thus simply pass the data on to computing device 202D.

In some embodiments, prior to performing cryptographic data protection actions using the new key, a key confirmation process (e.g., similar to the key confirmation process described above in connection with operation 806) may be performed in order to confirm that the computing devices have successfully derived the same new key. In this regard, as shown by operation 810, the apparatus 300 may include means, such as processor 302, memory 304, key confirmation circuitry 316, or the like, for performing a key confirmation process for the new key with the first device. For example, computing device 202A may perform a key confirmation process with computing device 202D to confirm both devices possess the correct new key.

Once the common key (and, in some embodiments, the new key) is obtained by the computing devices, various cryptographic data protection actions may be performed using the common key (or the new key). In this regard, as shown by operation 812, the apparatus 300 may include means, such as processor 302, memory 304, data protection circuitry 310, or the like, for performing a cryptographic data protection action using the common key or the new key. For example, each computing device 202A-202D now possesses a key which can be used to securely communicate with any of the other computing devices. Further, the end devices (computing device 202A and 202D) may now securely communicate data (e.g., encrypted with the new key) with each other without the intermediary devices gaining knowledge of the data.

As described above, example embodiments provide methods and apparatuses that enable secure key exchange. Example embodiments thus provide tools that overcome the problems faced in conventional processes, such as P2P encryption. For instance, example embodiments herein enable end-to-end first party and last (nth) party encryption (and decryption) without the overhead of P2P encryption (wherein each intermediary connection would decrypt inbound traffic and re-encrypt outbound traffic). By avoiding such overhead, example embodiments save both time and computational resources. Moreover, by leveraging a QERNG device to generate a random bit set and using the random bit set to generate cryptographic keys between communicating devices, embodiments described increase security of data transmitted between the devices.

FIGS. 5-8 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing description and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for secure key exchange, the method comprising:

deriving, by key derivation circuitry of a first device, a first key using at least a first random bit set distributed to a first pair of devices including the first device and a second device, the second device having also derived the first key using the first random bit set;

deriving, by the key derivation circuitry of the first device, a second key using at least a second random bit set distributed to a second pair of devices including the first device and a third device, the third device having also derived the second key using the second random bit set;

receiving, by communications hardware of the first device, a message from the second device, wherein the message received from the second device is encrypted using the first key derived by the first device and the second device, and wherein the message contains a common key derived based at least on a third random bit set known to the first device and the second device;

decrypting, by data protection circuitry of the first device, the message using the first key derived by the first device and the second device to produce a decrypted message;

encrypting, by the data protection circuitry of the first device, the decrypted message using the second key derived by the first device and the third device; and causing transmission, by the communications hardware of the first device, of the encrypted message containing the common key to the third device, the third device being enabled to decrypt the encrypted message using the second key derived by the first device and the third device to obtain the common key and securely communicate with the first device and the second device, wherein each pair of devices respectively derive a key by using a random bit set known only to each device in the respective pair.

2. The method of claim 1, wherein encrypting the message using the second key comprises performing, by a cryptographic hardware module associated with the first device, a key translation.

3. The method of claim 2, wherein performing the key translation comprises decrypting the message and encrypting the decrypted message within a secure boundary of the cryptographic hardware module.

4. The method of claim 1, wherein the second random bit set is obtained via a quantum entangled random number generator (QERNG).

5. The method of claim 1, wherein the first random bit set is obtained via a quantum entangled random number generator (QERNG).

6. The method of claim 1,
wherein the first key is derived only by the first device and the second device, and
wherein the first random bit set is distributed only to the first device and the second device.

7. The method of claim 1,
wherein the second key is derived only by the first device and the third device, and
wherein the second random bit set is distributed only to the first device and the third device.

8. A device for secure key exchange, the device comprising:
key derivation circuitry configured to:
derive a first key using at least a first random bit set distributed to a first pair of devices including the device and a second device, the second device having also derived the first key using the first random bit set, and
derive a second key using at least a second random bit set distributed to a second pair of devices including the device and a third device, the third device having also derived the second key using the second random bit set;
communications hardware configured to receive a message from the second device, wherein the message received from the second device is encrypted using the first key derived by the device and the second device, and wherein the message contains a common key derived based at least on a third random bit set known to the device and the second device; and
data protection circuitry configured to:
decrypt the message using the first key derived by the device and the second device to produce a decrypted message; and
encrypt the decrypted message using the second key derived by the device and the third device,
wherein the communications hardware is further configured to cause transmission of the encrypted message containing the common key to the third device, the third device being enabled to decrypt the encrypted message using the second key derived by the device and the third device to obtain the common key and securely communicate with the device and the second device, wherein each pair of devices respectively derive a key by using a random bit set known only to each device in the respective pair.

9. The device of claim 8, further comprising a cryptographic hardware module configured to encrypt the message using the second key by performing a key translation.

10. The device of claim 9, wherein the cryptographic hardware module performs the key translation by decrypting the message and encrypting the decrypted message within a secure boundary of the cryptographic hardware module.

11. The device of claim 8, wherein the second random bit set is obtained via a quantum entangled random number generator (QERNG).

12. The device of claim 8, wherein the first random bit set is obtained via a quantum entangled random number generator (QERNG).

13. The device of claim 8,
wherein the first key is derived only by the device and the second device, and
wherein the first random bit set is distributed only to the device and the second device.

14. The device of claim 8,
wherein the second key is derived only by the device and the third device, and
wherein the second random bit set is distributed only to the device and the third device.

15. A computer program product for secure key exchange, the computer program product comprising at least one non-transitory computer-readable storage medium storing software instructions that, when executed by a processor, cause a first device to:
derive a first key using at least a first random bit set distributed to a first pair of devices including the first device and a second device, the second device having also derived the first key using the first random bit set;
derive a second key using at least a second random bit set distributed to a second pair of devices including the first device and a third device, the third device having also derived the second key using the second random bit set;
receive a message from the second device, wherein the message received from the second device is encrypted using the first key derived by the first device and the second device, and wherein the message contains a common key derived based at least on a third random bit set known to the first device and the second device;
decrypt the message using the first key derived by the first device and the second device to produce a decrypted message;
encrypt the decrypted message using the second key derived by the first device and the third device; and
cause transmission of the encrypted message containing the common key to the third device, the third device being enabled to decrypt the encrypted message using the second key derived by the first device and the third device to obtain the common key and securely communicate with the first device and the second device, wherein each pair of devices respectively derive a key by using a random bit set known only to each device in the respective pair.

16. The computer program product of claim 15,
wherein the first key is derived only by the first device and the second device, and
wherein the first random bit set is distributed only to the first device and the second device.

17. The computer program product of claim 15,
wherein the second key is derived only by the first device and the third device, and wherein the second random bit set is distributed only to the first device and the third device.

* * * * *